May 8, 1962     O. A. R. TJERNSTRÖM     3,033,325
DEVICE FOR HYDRAULICALLY OR PNEUMATICALLY CONTROLLED BRAKES
Filed Oct. 27, 1960
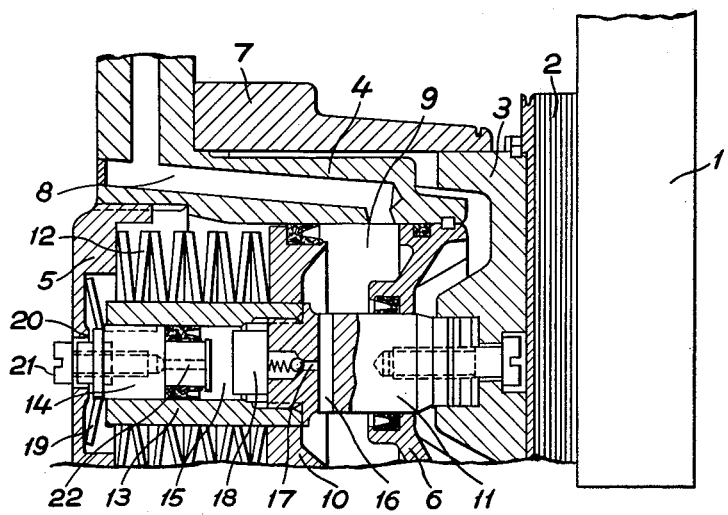
INVENTOR.
OVE Tjernström
BY
Bailey, Stephens, Huettig
ATTORNEYS

United States Patent Office 3,033,325
Patented May 8, 1962

3,033,325
DEVICE FOR HYDRAULICALLY OR PNEUMATICALLY CONTROLLED BRAKES
Ove A. R. Tjernström, Vasteras, Sweden, assignor to Allmanna Svenska Elektriska Aktiebolaget, Vasteras, Sweden, a corporation of Sweden
Filed Oct. 27, 1960, Ser. No. 65,386
Claims priority, application Sweden Nov. 7, 1959
3 Claims. (Cl. 188—170)

The following invention relates to a device for automatic and continuous subsequent adjustment of the air gap between a brake block and a brake surface in hydraulically or pneumatically controlled brakes.

One object of the invention is to obtain a constant air gap between brake block and brake surface at all times regardless of the wearing of the brake lining.

Another object of the invention is to obtain a constant fall time or actuating time for the brake.

These and other essential objects of the invention are obtained by the invention, which is characterized in that a piston movable in a brake cylinder is coupled to the brake block, which piston is influenced by a pressure medium and/or a pressure spring for the disconnecting and closing of the brake block. A second cylinder, preferably concentric with the first one, is arranged in connection with the said piston, in which latter cylinder a piston is arranged movable in relation to the first mentioned piston and at least one disconnected brake block in connection with a spring. The first mentioned piston or devices rigidly connected with the same are provided with a check valve and channels for pressure medium leading to this valve, which check valve only permits passage of pressure medium in the direction to the other cylinder.

In order to prevent the smaller second piston from contacting the end wall of the brake cylinder at full working pressure of the brake, the spring in contact with the smaller piston is given a spring tension preventing the stopping of the piston from contacting the end wall.

When the smaller piston is to be returned to the zero-position, for example during a change of brake lining, the permanently increasing volume of pressure medium in the coaxial cylinder must be reduced during the wearing down of the old brake lining, and for this purpose the smaller piston is provided with an axial channel, in which a tightening screw is arranged, which is accessible from the outside of the brake cylinder through the opening in one end wall of the brake cylinder.

An embodiment of the device in accordance with the invention is further described below with reference to the enclosed, schematic drawing, which in longitudinal section shows the device with a closed brake block.

In the drawing, 1 designates the brake disc and 2 the brake lining of the brake block 3. The brake cylinder 4 with end walls 5 and 6 is mounted in a yoke 7. In the brake cylinder a duct 8 is arranged for the pressure medium, which duct ends in the cylinder space 9, limited by a piston 10 fastened to a rod 11 carrying the brake block 3. A brake spring 12 is arranged between the piston 10 and the end wall 5, which spring may for example be a cup spring, and gives the brake pressure necessary for the braking.

An adjustment cylinder 13 enclosing a cylindric space 15 parallel to and preferably coaxial with the brake piston 10, is arranged in rigid connection with said brake piston. An adjustment piston 14 movably arranged in the cylindrical space 15 limits this space at the end farther away from the brake block. The space 15 is in connection with the cylinder space 9 of the brake cylinder 4 through ducts 16 and 17 and a non-return valve 18 arranged in any suitable way between said spaces 15 and 9. The non-return valve 18 permits the pressure medium to flow only in the direction towards the space 15.

The adjustment piston 14 at its other end, opposite the end defining the cylinder space 15, rests against a pressure spring 19, at least when the pressure medium forces the piston 14 against said spring, that is when the brake is released. The spring 19 is arranged between the piston 14 and the end wall 5 of the brake cylinder 4. The end wall may be provided with a stop 20 for the adjustment piston 14, but the spring 19 is then dimensioned in such a way that the piston 14 cannot reach the stop 20 before the proper air gap is obtained. A tightening screw 21 is arranged in the piston 14 and tightens an axial duct 22 in the piston 14, through which duct the pressure medium may be drained off. The screw 21 is accessible through an opening in the end wall 5 of the brake cylinder.

When the brake is released the pressure medium is acting on the piston 10 with full working pressure, thus pulling the brake block 3 away from the brake disc 1. The pressure medium trapped by the non-return valve 18 in the space 15 compresses the spring 19, which is strong enough to prevent the piston 14 from reaching the stop face 20 before the proper air gap is obtained. By reducing the pressure of the pressure medium the brake is engaged, that is, the brake spring 12 pressing against the brake piston 10 moves said piston, the adjustment cylinder 13, the rod 11 and the brake block 3 towards the brake disc 1, whereby the brake lining 2 is pressed against said brake disc. This movement enlarges the space 15, thereby releasing the pressure therein and allowing the spring 19 to unload itself by pushing the adjustment piston 14 to the right in the drawing. When the lining 2 is worn, the brake piston 10 and the adjustment cylinder 13 move further to the right in the drawing and the adjustment piston 14 may then leave the spring 19 or additional pressure medium may flow to the space 15 through the non-return valve 18.

When the brake is to be released after wear of the brake lining has taken place, the pressure is built up in the cylinder space 9 and, as the said space is in connection with the space 15 of the adjustment cylinder 13, the pressure upon the adjustment piston 14 is also increased so that the spring 19 is again somewhat compressed whereby a certain amount of additional pressure medium, corresponding to the wear of the brake lining, flows through the non-return valve 18 to the space 15 until the pressure in the space 9 has reached a value at which the force on the brake piston 10 overcomes that of the brake spring 12 and the piston 10 starts moving to the left in the drawing. At this moment the pressure medium in the space 15 is trapped by the non-return valve 18 and, because of the said additional amount of pressure medium in the space 15, the unit comprising the cylinder 13, the piston 10, the rod 11, the brake block 3 and the brake lining 2 will be displaced relatively to the adjustment piston 14 to the right in the drawing a distance equal to the wear of the brake lining 2. In this manner the spring 19 or preferably the stop 20 will stop the movement of the brake block to the left at a point which is a certain distance to the right compared with the released brake position before the wear of the brake lining took place and thus the automatic adjustment of the air gap is obtained.

If the brake lining is to be changed, the adjustment piston 14 must be returned to the initial position or the zero position and for accomplishing this adjustment the pressure medium is drained through the duct 22 in the piston 14.

Through an automatic adjustment of the air gap in the brake, the cylinder space 9 of the brake piston 10 is at all times kept at a minimal volume, which means faster filling and draining of the cylinder space 9 in relation to brakes without any continuous adjustment of the air gap where the cylinder volume is constant and maximal when the brake is disconnected.

What I claim is:

1. In a brake of the type having a brake block and a cooperating brake surface and having means normally holding the block in engagement with the brake surface, means for the automatic and continuous adjustment of the air gap between the brake block and the brake surface comprising a stationary brake cylinder, a reciprocating brake piston in the cylinder connected to the brake block, means to supply pressure medium to said cylinder for releasing the brake, an adjustment cylinder rigidly connected with said brake piston and parallel thereto, a reciprocating adjustment piston in said adjustment cylinder, a pressure spring engaging said adjustment piston at its end further away from the said brake block, said adjustment piston being in contact at its opposite end with said pressure medium, duct means for conducting pressure medium from said brake cylinder to said adjustment cylinder to act on the last-mentioned end of the adjustment piston, and a non-return valve in said duct means to prevent back-flow of said pressure medium in said duct means from said adjustment cylinder to said brake cylinder.

2. Device as claimed in claim 1, comprising a stop for the movement of said adjustment piston in the direction against said pressure spring, said stop being rigidly connected with said brake cylinder, the said pressure spring having a spring tension of a magnitude such as to prevent said adjustment piston from reaching said stop before the proper air gap between said brake block and said brake surface is obtained.

3. A device as claimed in claim 1 in which said pistons are coaxial.

References Cited in the file of this patent

UNITED STATES PATENTS

| | | |
|---|---|---|
| 2,234,689 | Chard | Mar. 11, 1941 |
| 2,638,750 | Hettinger | May 19, 1953 |
| 2,815,830 | Oswalt | Dec. 10, 1957 |
| 2,923,132 | Oswalt | Feb. 2, 1960 |